(12) United States Patent  
Kishi (10) Patent No.: US 8,078,798 B2
(45) Date of Patent: Dec. 13, 2011

(54) MANAGING FIRST LEVEL STORAGE IN A MULTI-HOST ENVIRONMENT

(75) Inventor: Greg T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/465,430

(22) Filed: May 13, 2009

(65) Prior Publication Data

US 2010/0293328 A1  Nov. 18, 2010

(51) Int. Cl.
*G06F 12/00* (2006.01)
*G06F 13/00* (2006.01)
*G06F 13/28* (2006.01)

(52) U.S. Cl. ........ 711/111; 711/173; 711/162; 711/130; 711/117

(58) Field of Classification Search .................. 711/111, 711/173, 171, 162, 130, 6, 117, 113, 170, 711/165; 703/24
See application file for complete search history.

(56) References Cited

U.S. PATENT DOCUMENTS 5,926,834 A    7/1999  Carlson et al.
7,747,816 B1 * 6/2010  Nourmohamadian et al. ............................ 711/111

* cited by examiner

*Primary Examiner* — David Lam
(74) *Attorney, Agent, or Firm* — Dan Shifrin (57) ABSTRACT

A virtual tape server (VTS) and a method for managing shared first level storage, such as a disk cache, among multiple virtual tape servers are provided. Such a system and method manage first level storage to accommodate two or more host processing systems by maintaining adequate free space in the cache for each host and by preventing one host, such as a mainframe, from taking over free space from another host, such as a Linux system.

8 Claims, 12 Drawing Sheets

MANAGING FIRST LEVEL STORAGE IN A MULTI-HOST ENVIRONMENT

RELATED APPLICATION DATA

The present application is related to commonly-assigned U.S. Pat. No. 5,926,834 entitled VIRTUAL DATA STORAGE SYSTEM WITH AN OVERRUN-RESISTANT CACHE USING AN ADAPTIVE THROTTLE BASED UPON THE AMOUNT OF CACHE FREE SPACE (hereinafter "the '834 patent"), which patent is incorporated herein by reference in its entirety.

TECHNICAL FIELD

The present invention relates generally to virtual data storage systems, such as virtual tape storage systems. More particularly, the present invention relates to managing first level storage, such as a disk cache, to accommodate two or more host processing systems by maintaining adequate free space in the cache for each host and by preventing one host, such as a mainframe, from taking over free space from another host, such as a Linux system.

BACKGROUND ART

Data processing systems typically require a large amount of data storage. These systems often comprise multiple host processors concurrently storing data to multiple storage volumes through multiple drive units. The data storage within these systems often includes removable media, such as magnetic tape or optical disk, since it is useful for data that must be stored for long periods of time, data that is infrequently accessed, or data that is backed-up or migrated from more accessible storage media, such as electronic memory or DASD. Removable media also has an economic advantage in that it provides a lower cost per unit of storage.

Virtual data storage systems, more commonly implemented as virtual tape storage (VTS) systems, have been developed to increase the efficiency and economics of tape storage systems. Tape storage systems which attach to multiple host processing systems typically require many tape drives to accommodate concurrent demands made by separate host processors for accessing separate tape storage volumes. Accordingly, the tape storage system may utilize the tape drives in bursts of high activity separated by intervals of little activity. VTS systems overcome this problem by providing interfaces to the host processors for addressing many more tape drives than actually exist within the storage subsystem. The attached host processors transfer data files to the VTS system as tape volumes, or logical volumes. The VTS system first stores the logical volumes as files in a first level (cache) storage, such as a direct access storage device (hereinafter "DASD" or "disk") or an electronic memory, and subsequently writes the data files from the cache storage to the tape storage subsystem. While the logical volume is stored in the cache storage, it appears to the host processor that the logical volume has been stored as a tape volume in the VTS system. The VTS system manages the migration of the data file to a tape storage volume and selects which physical tape drive is used to store the data.

The VTS system uses the cache storage to buffer data transfers between the tape storage and the attached host processors. When the host processors write data to the VTS system, the data is stored in the cache storage. Host mount requests also involve the cache storage. If the requested data file is contained within the cache storage, a "cache hit" allows the VTS system to immediately make the data available to the host processor. If the requested file has been migrated to a tape volume, the VTS system must recall the file from the tape volume, copy the file into the cache storage, and then make the data available to the requesting host processor from the cache storage. The VTS system also uses the cache storage to provide quick responses to the attached host processors. Host write operations are considered complete once the logical volume has been stored as a data file in the cache storage, even though the data file hasn't yet been "hardened" to the tape. Thus, the VTS system must manage the cache storage and the tape storage volumes such that the more frequently requested data files, or logical volumes, reside in the cache storage.

Figure 1:
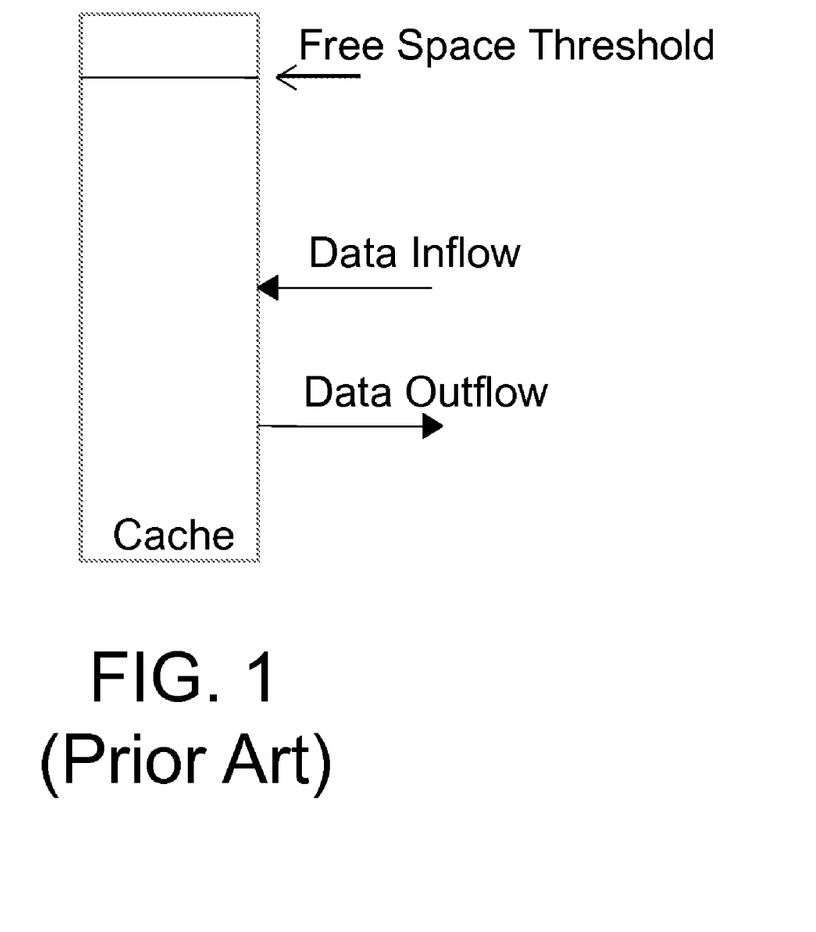
FIG. 1 is a representation of data flowing into and out of a prior art cache.

The VTS must also manage the capacity of the cache storage. Write operations from the attached host processors fill the cache storage with data files. Additionally, host read operations can also fill the cache storage with data files. If the read request results in a cache miss, because the data file was previously migrated to a tape storage volume, the requested data file must be recalled from the tape storage volume to the cache storage and then transferred to the host processor. Higher performance, efficient VTS systems also premigrate data files from the cache storage to the tape storage volumes. That is, the VTS system copies the data file to a selected tape storage volume, but does not immediately remove the file from the cache storage. In this scheme, the VTS system has transferred the data file as a logical volume to the tape storage volume but has kept a copy in the cache storage, providing faster host access to the data file. Thus, premigrating data files provides no relief to the storage capacity constraints placed on the cache storage. The VTS system must migrate infrequently accessed data files from the cache storage to provide available space for the incoming data files. Typically, the cache storage fills at a faster rate than it is emptied. Thus, some means must be provided to balance the incoming data rate with the outgoing data rate and maintain sufficient free space to prevent the cache storage from quickly overrunning, or overflowing, its capacity. FIG. 1 represents a prior art cache in which a minimum amount of free space is maintained to help balance the inflow and outflow of data.

SUMMARY OF THE INVENTION

A virtual tape server (VTS) is provided which comprises first and host adapters through which first and second hosts, respectively, are coupled, a VTS controller and a virtual tape emulation (VTE) through which a first level storage unit is coupled. The first level storage unit has a first partition allocated to the first host and a second partition allocated to the second host. The VTS also comprises first and second hierarchical storage controllers ("HSC") coupled to a first physical tape storage unit ("first tape unit") and a second physical tape storage unit ("second tape unit"), respectively. The first HSC is operable to manage removal of data from the first partition to the first tape unit and the second HSC is operable to manage removal of data from the second partition to the second tape unit.

The VTS further comprises first and second free-space controllers coupled to the VTS controller. The first free-space controller is operable to determine a total amount of free space in the first level storage unit and the second free-space controller is operable to determine an amount of free space in the second partition. The VTS also comprises first and second throttling controllers responsive to the first and second free-space controllers, respectively, and operable to manage the flow of data to the first and second partitions, respectively.

The VTS controller is operable to periodically receive an indication of the total amount of free space in the first level storage unit, periodically receive an indication of the amount of free space in the second partition from the second free-space controller, calculate a difference between the total amount of free space in the first level storage unit and the amount of free space in the second partition, and periodically transmit to the first free-space controller the calculated difference as the amount of free space available to the first partition, whereby free space in the second partition is not encroached upon by data associated with the first host.

A method for managing shared first level storage among multiple virtual tape servers is also provided. The method comprises partitioning a first level storage unit into first and second partitions, allocating the first partition to a first host and allocating the second partition to a second host, receiving first user data for the first host and determining the amount of free space in the first level storage unit. The method further comprises determining the amount of free space in the second partition and calculating the difference between the amount of free space in the first level storage unit and the amount of free space in the second partition. If the calculated difference is greater than a first threshold, the received first user data is stored in the first partition.

If the calculated difference is not greater than the first threshold, the received first user data is throttled, second user data, previously stored in the first partition, is copied from the first partition to a second level storage unit and the amount of free space in the first level storage unit is re-determined. Additionally, the amount of free space in the second partition is re-determined and the difference between the amount of free space in the first level storage unit and the amount of free space in the second partition is recalculated. If the calculated difference is not greater than the first threshold, the previous five steps are repeated until the calculated difference is greater than the first threshold. When the calculated difference is greater than the first threshold, the received first user data is stored in the first partition.

Thus, such a system and method manage first level storage, such as a disk cache, to accommodate two or more host processing systems by maintaining adequate free space in the cache for each host and by preventing one host, such as a mainframe, from taking over free space from another host, such as a Linux system.

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and may exist, at least partially, merely as electronic signals on a system or network.

Furthermore, the described features, structures, or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention. Additionally, when the term "couple" is used to describe a relationship between components, it will be understood that the components are not necessarily directly connected to each other but that there may be intermediate components.

The depicted order and labeled steps in the flow chart that follows are indicative of one embodiment of the presented process. Other steps and processes may be conceived that are equivalent in function, logic, or effect to one or more steps, or portions thereof, of the illustrated process. Additionally, the format and symbols employed are provided to explain the logical steps of the process and are understood not to limit the scope of the process. Arrows or other connectors are used to indicate only the general logical flow of the process. Additionally, the order in which a particular process occurs may or may not strictly adhere to the order of the corresponding steps shown.

Figure 2:
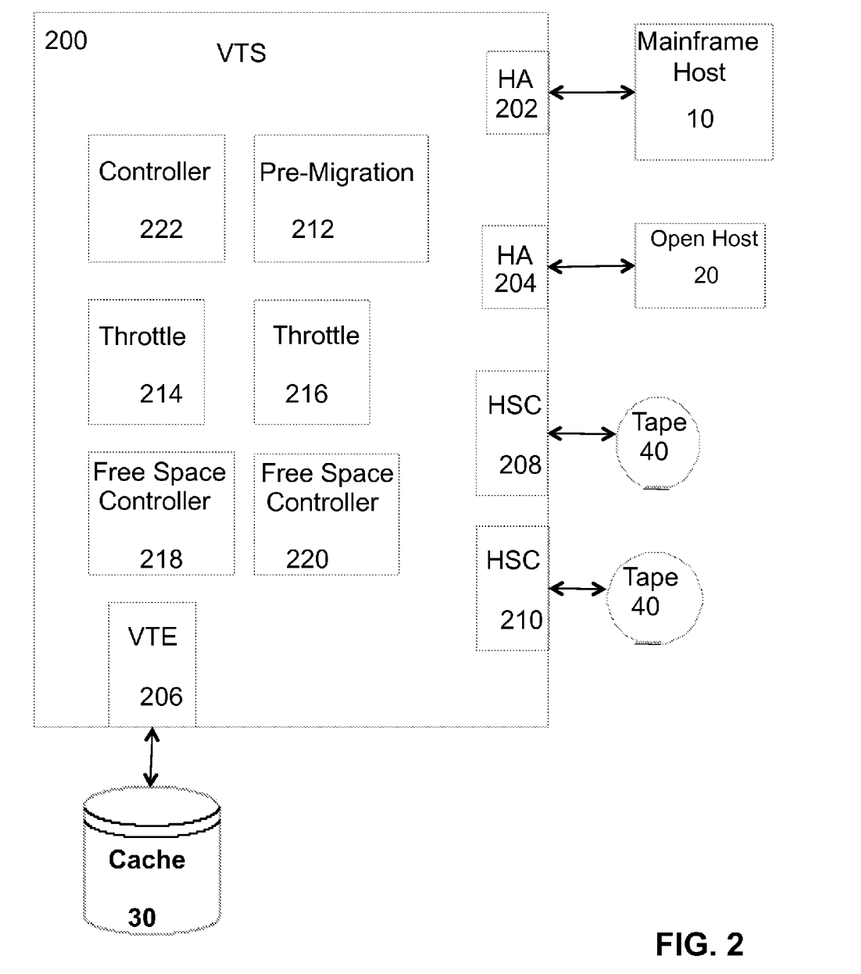
FIG. 2 is a block diagram representing a virtual data storage system of the present invention.

FIG. 2 is a block diagram representing a virtual data storage system 200, for example an IBM TS77xx Virtual Tape Server ("VTS"), which is shown coupled to a first host processing system 10 (also referred to herein as the "primary host" or "host 1"), such as a mainframe running the Z/OS operating system, and a second host processing system 20, such as an "open" or Linux system (also referred to herein as the "secondary host" or "host 2"). It will be appreciated that the present invention may be implemented in a system in which the host processing systems are other than the mainframe and Linux systems used herein as examples. Moreover, the present invention may also be implemented with virtual tape servers coupled to more than two host processing systems.

The VTS 200 includes a host adapter ("HA") 202, 204 through which each host system 10, 20 is coupled to the VTS 200. The VTS 200 also includes a virtual tape emulation (VTE) module 206, through which a first level storage, such as a disk cache 30 is coupled. The VTS 200 further includes a hierarchical storage controller ("HSC") 208, 210 assigned to each host system 10, 20 through which one or more physical tape devices or tape libraries, represented generally by the devices 40, are coupled.

Application programs running within either of the host processing systems 10, generate data to be stored on logical volumes within the VTS 200. In operation, one of the host processing systems, for example host 10, writes a data file to a specific virtual storage device within the VTS 200. The data file is transferred along a selected data path corresponding to a virtual device address. A storage controller or manager 222 directs the host-originated data file to the cache storage 30, recording the data file identifier and its cache storage position in a directory within the cache storage. A premigration controller 212 manages the process of copying data to the physical tape device 40 without being removed from the cache 30.

Figure 3A:
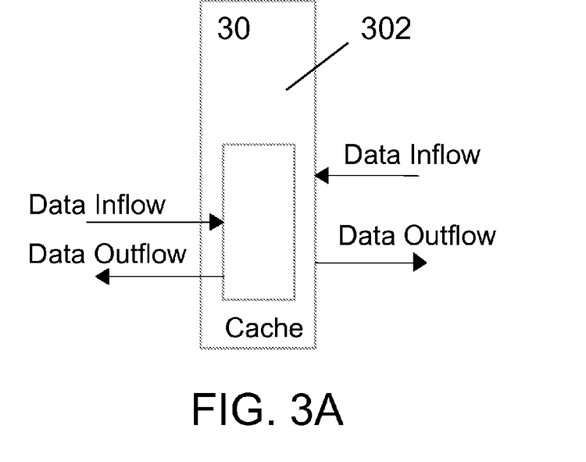
FIGS. 3A and 3B illustrate the partitioning of a cache and the establishment of free space thresholds for each partition.

In one embodiment, the cache 30 is shared by both hosts 10, 20 by being divided into one partition 302 allocated to one host 10 and a second partition 304 allocated to the other host 20, as illustrated in FIG. 3. In one aspect of this embodiment, the partitions are fixed in size with fixed boundaries to prevent data of one host from encroaching into the cache space of the other host.

For more flexibility, partition sizes may be dynamically established based on the respective workloads of each host 10, 20. In such a configuration, each host 10, preferably has a throttle controller 214, 216 assigned to prevent the cache 30 from being overrun when an attempt is made to add data to the cache 30 faster than other data is migrated to the tape device 40. Premigration and throttling are described in detail in the aforementioned '834 patent and will not be described herein.

Figure 3B:
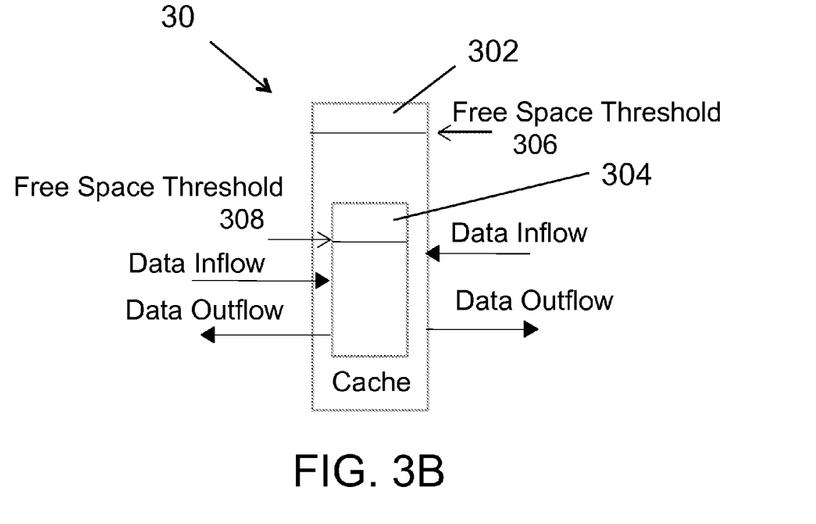

To aid the throttling process, free space thresholds 306, 308 are established for each partition, 302, 304 (FIG. 3B). Free-space controllers 218, 220 assigned to the hosts 10, 20 to track the amount of free space in the partitions 302, 304.

Each of the components in the VTS 200 is coupled to the storage manager or controller 222 which manages the operation of the VTS 200. The storage manager 222 may comprise any digital processing apparatus such as a microprocessor, a personal computer, or a more advanced processing machine. The HSCs 208, 210, the premigration controller 212, the throttle controllers 214, 216, and the free-space controllers 218, 220 may be separate modules or may be incorporated into the storage manager 222. For purposes of clarity, they are described herein as separate functional modules.

Figure 4:
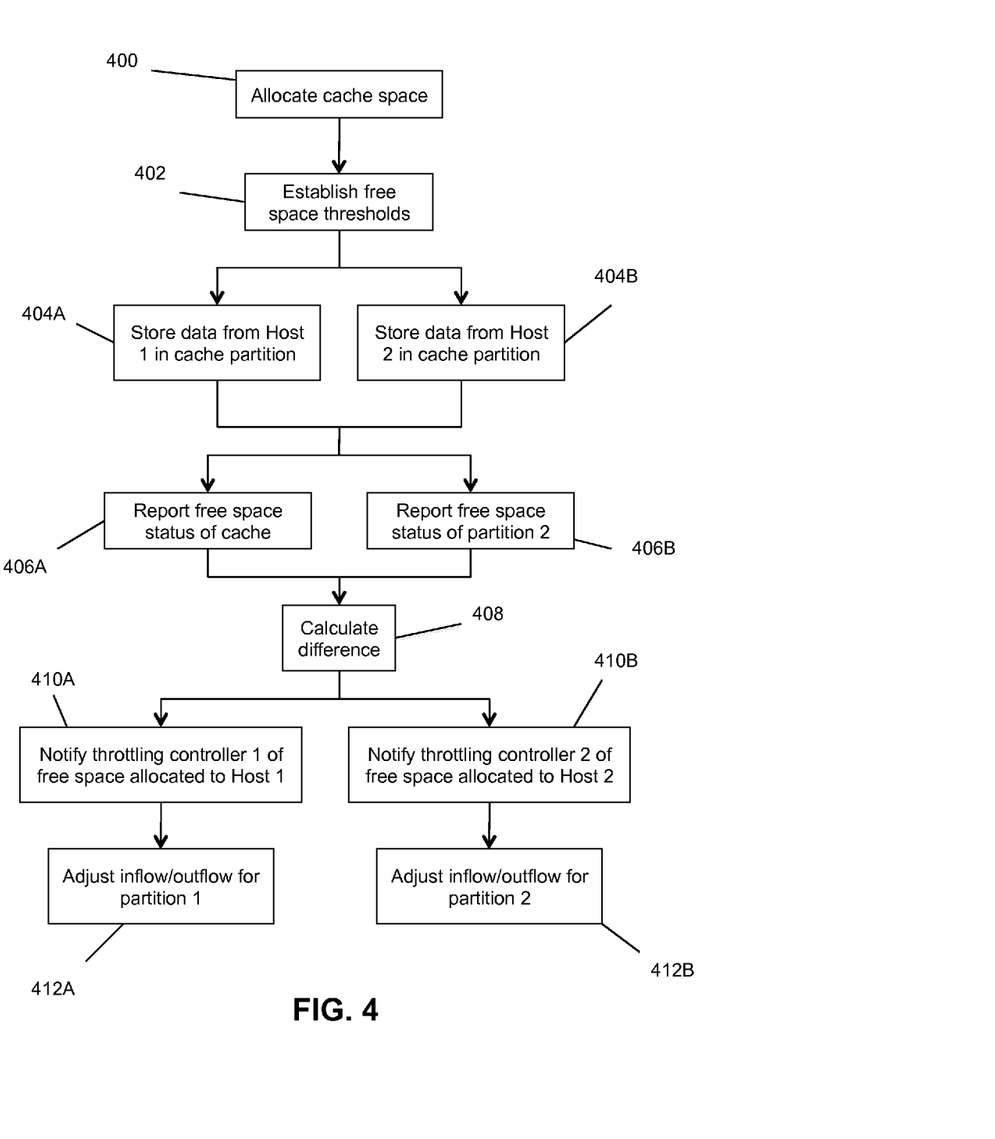
FIG. 4 is a flow chart of a method of the present invention.

Referring to the flow chart of FIG. 4, space in the first level storage (such as the cache 30) is allocated between the hosts, 10 and 20, or among more hosts if the system is coupled to more than two hosts (step 400). A free space threshold is then established for each partition (step 402). Both the size of the partitions and the free space thresholds may be fixed or may be set by the VTS controller 222 dynamically as workloads change. During normal read and write operations, data associated with the primary host 10 is written to its partition 302 in the cache 30 (step 404A). Similarly, data associated with the secondary host 20 is written to its partition 304 in the cache 30 (step 404B). Periodically, the file system, such as the disk file system if the first level storage is disk cache, reports the total amount of free space in the cache 30 to the VTS controller 222 (step 406).

Figure 5:
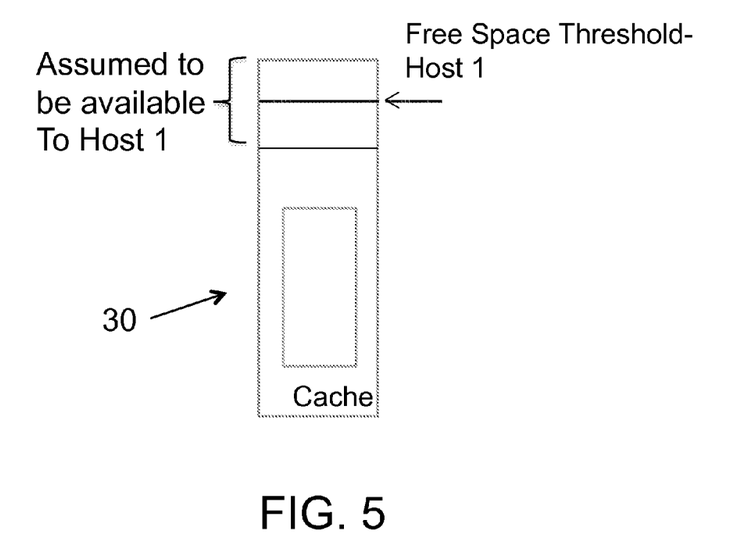
FIG. 5 illustrates how the primary host sees the cache and the available free space.

If the VTS controller 222 transmitted the total amount of free space in the cache 30 to the throttling controller 114 associated with the primary host 10, the throttling controller 114 would "see" that amount of free space as being available to the primary host 10, as illustrated in FIG. 5, and adjust the inflow and outflow of data into the partition 302 accordingly. The result could be that the partition 304 assigned to the secondary host 20 might have insufficient free space for the throttling controller 116 assigned to the secondary host 20 to properly manage the partition 304.

Figure 6:
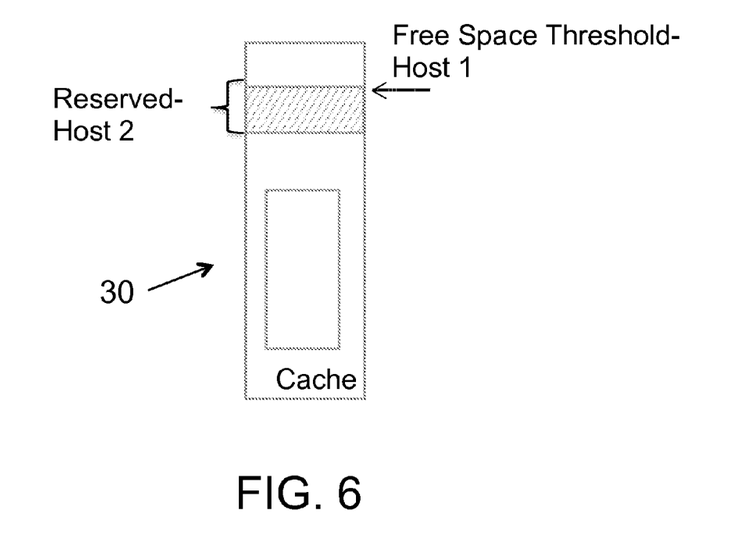
FIG. 6 illustrates the reservation of free space for the secondary host.

To alleviate the contention, the amount of free space in the partition 304 assigned to the secondary host 20 is also periodically reported to the VTS controller 222 (step 408). The VTS controller 222 calculates the difference between the total amount of free space in the cache 30 and the amount of free space in the partition 304 assigned to the secondary host 20 (step 410). The difference, representing the amount of free space in the partition 302 allocated to the primary host 10, is transmitted to the throttling controller 114 assigned to the primary host 10 (412), as illustrated in FIG. 6. This throttling controller 114 is then able to adjust the inflow and outflow of data into and out of the partition 302 according to the amount of free space which is actually available to the primary host 10 (step 414) without encroaching into free space which had been reserved for the secondary host 20. Similarly, the other throttling controller 116 is also able to adjust the inflow and outflow of data into and out of the partition 304 according to the amount of free space which is reserved for use by the secondary host 20 (step 416).

Figure 7:
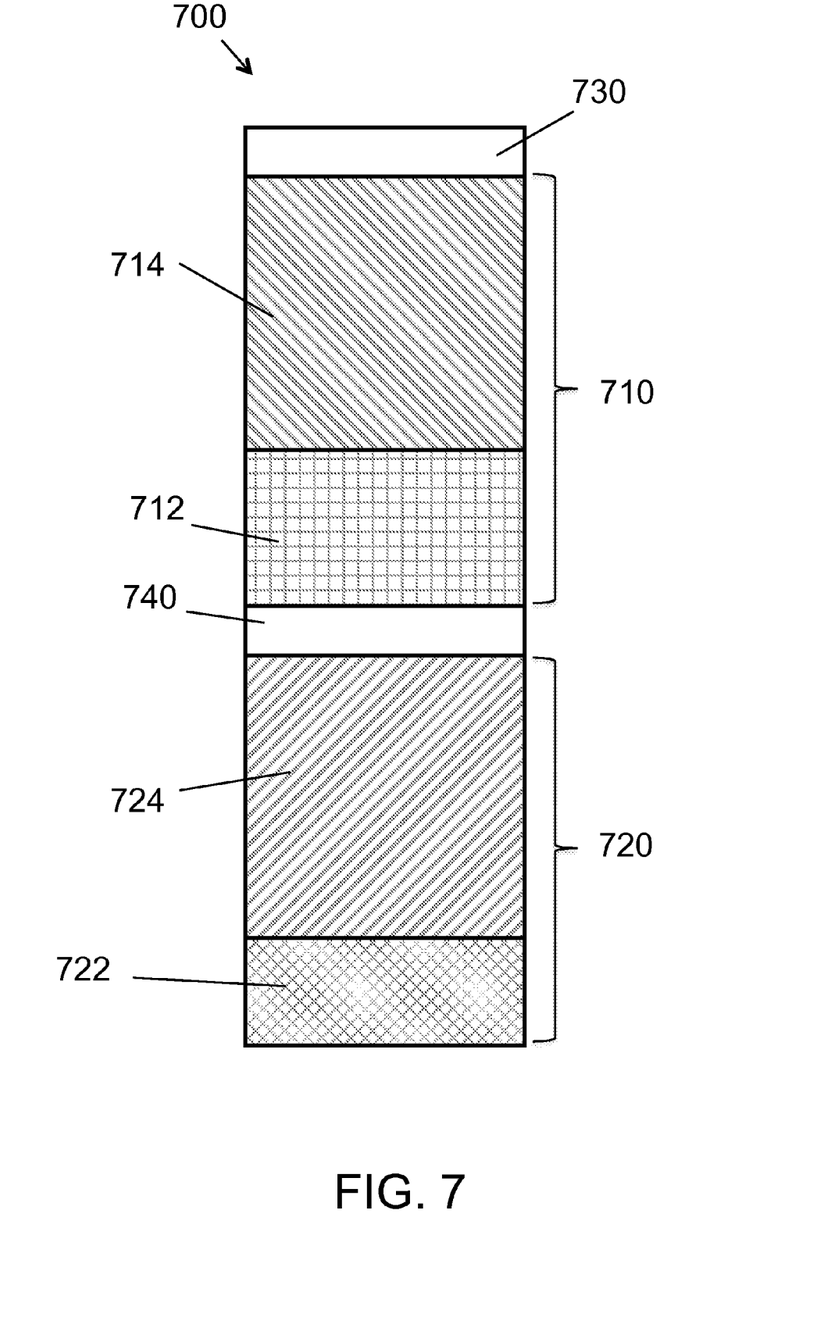
FIG. 7 illustrates the ideal reservation of free space for the secondary host.

FIG. 7 is another representation of a cache 700. Ideally, the cache 700 would operate as follows. A first portion (mainframe host partition) 710 of the cache 700 is allocated to mainframe host data and a second portion (open host partition) 720 is allocated to open host data. Resident mainframe data (data which is stored only in the cache 700) is stored in one part 712 of the mainframe host partition 710. A mainframe premigration threshold establishes the maximum size of the resident mainframe data part 712. When the contents of the resident mainframe data part 712 approaches the limit, the incoming data is throttled down to match the rate at which the mainframe data can be written to the tape. Premigrated mainframe data (data which has been written to tape but not to cache) is stored in a second part 714 of the mainframe host partition 710.

Similarly, resident open host data is stored in one part 722 of the open host partition 720. An open premigration threshold establishes the maximum size of the resident open data part 722. Premigrated open data (data which has been written to tape but not to cache) is stored in a second part 724 of the open host partition 720. When the contents of the resident open data part 722 approaches the limit, the incoming data is throttled down to match the rate at which the open data can be written to the tape.

A third portion 730 of the cache 700 is allocated as a free space buffer to prevent cache overrun. When necessary, the mainframe cache controller will remove premigrated mainframe data from the second part 714 of the first portion 710 of the cache 700 in order to provide the specified amount of free space 730. If the removal rate fall behind the rate at which data is moved into the second part 714 from the mainframe host, the latter rate is throttled down to match the former rate. A fourth portion 740 of the cache 700 is allocated as a free space buffer for open host operations. The amount of space in the fourth portion 740 is transmitted to the mainframe controller.

Figure 8:
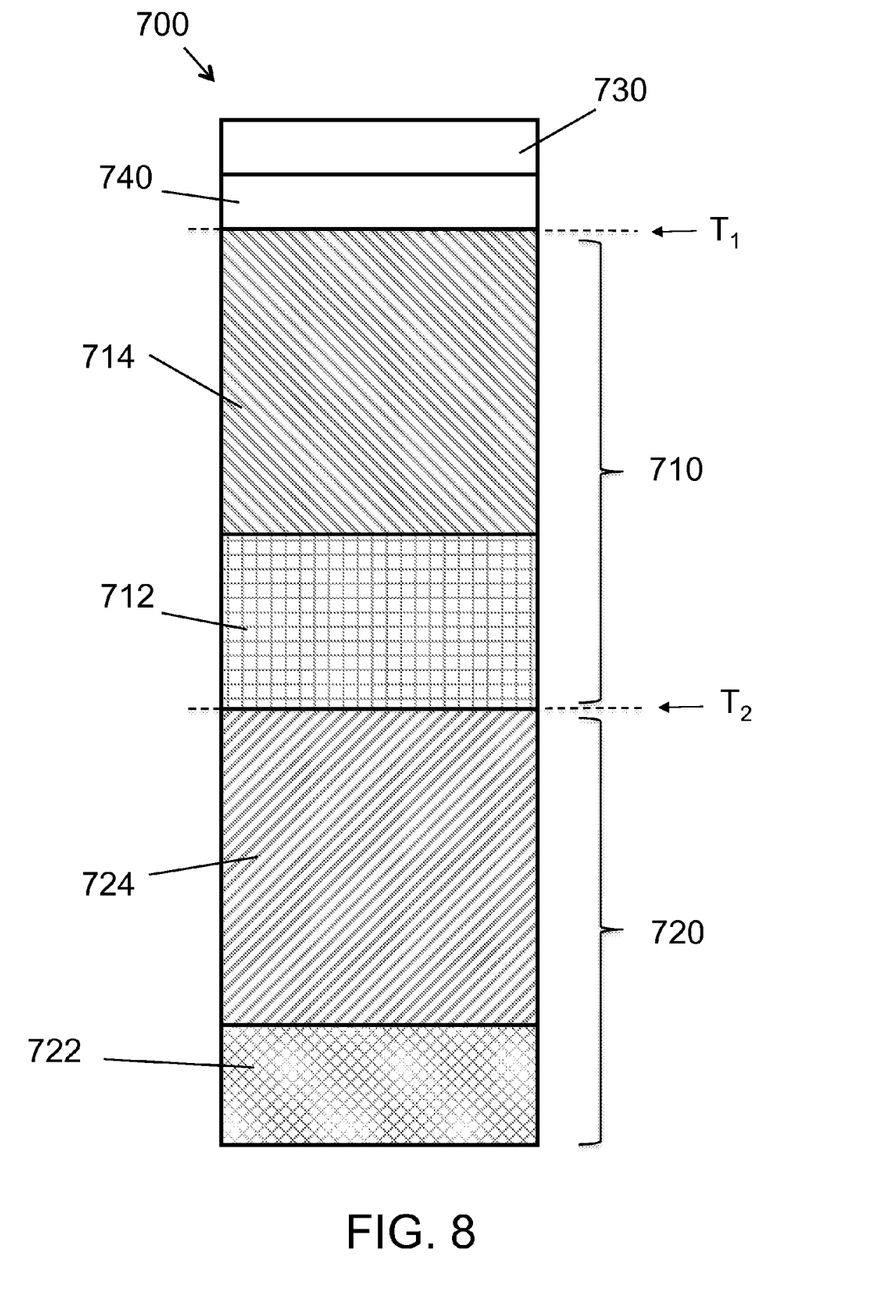
FIG. 8 illustrates the actual reservation of free space for the secondary host.

However, as illustrated in FIG. 8, the actual use of the cache 700 is not ideal. The arrow identified in FIG. 8 as $T_1$ is the disk free space managed threshold and is equal to the amount of caches free space 730 and the open host free space 740. In operation, the mainframe controller sets the threshold $T_1$ and removes data from the mainframe premigrated space 714 when necessary to maintain the disk free space threshold $T_1$. The open host premigration threshold is indicated by the arrow identified as $T_2$.

Figure 9:
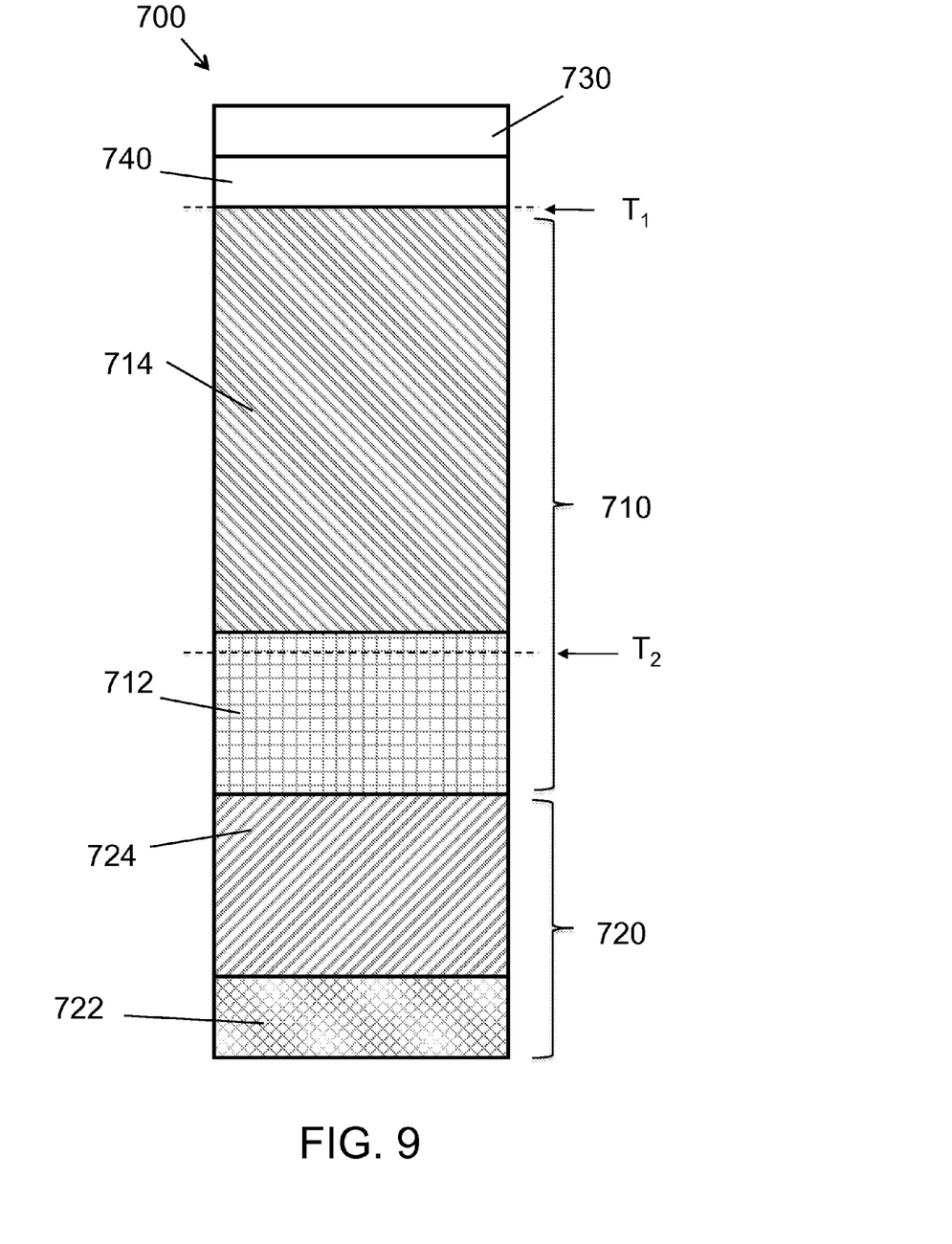
FIG. 9 illustrates the reservation of free space for the secondary host when the open host is not using the full amount of its allocated partition.

As illustrated in FIG. 9, when the open host is not using the full amount of its allocated partition 720, the mainframe host controller is able to expand the space 714 in which premigrated data is stored, thereby encroaching into the open host partition 720.

Figure 10:
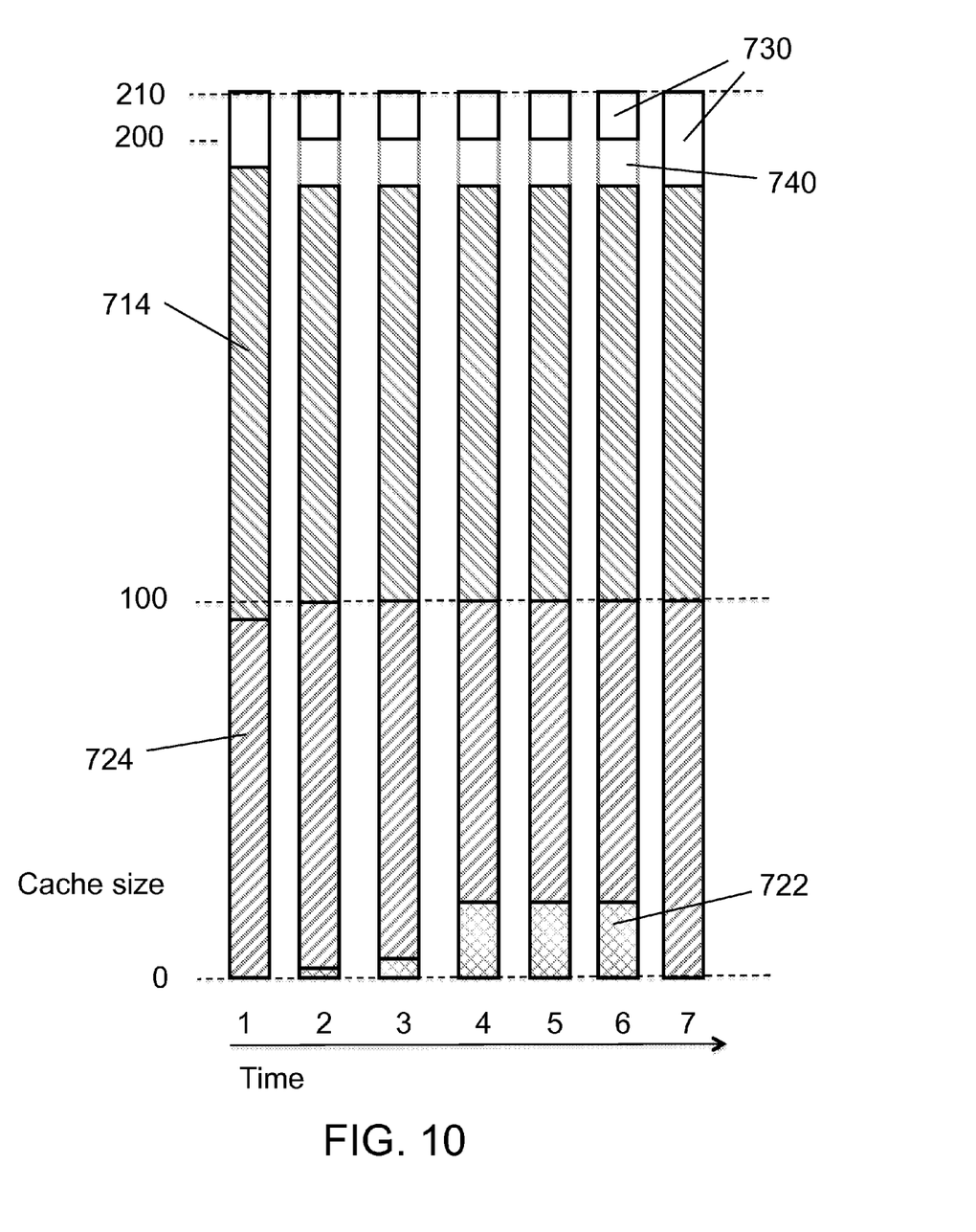
FIG. 10 illustrates a first sequence of how the cache is used.
Figure 11:
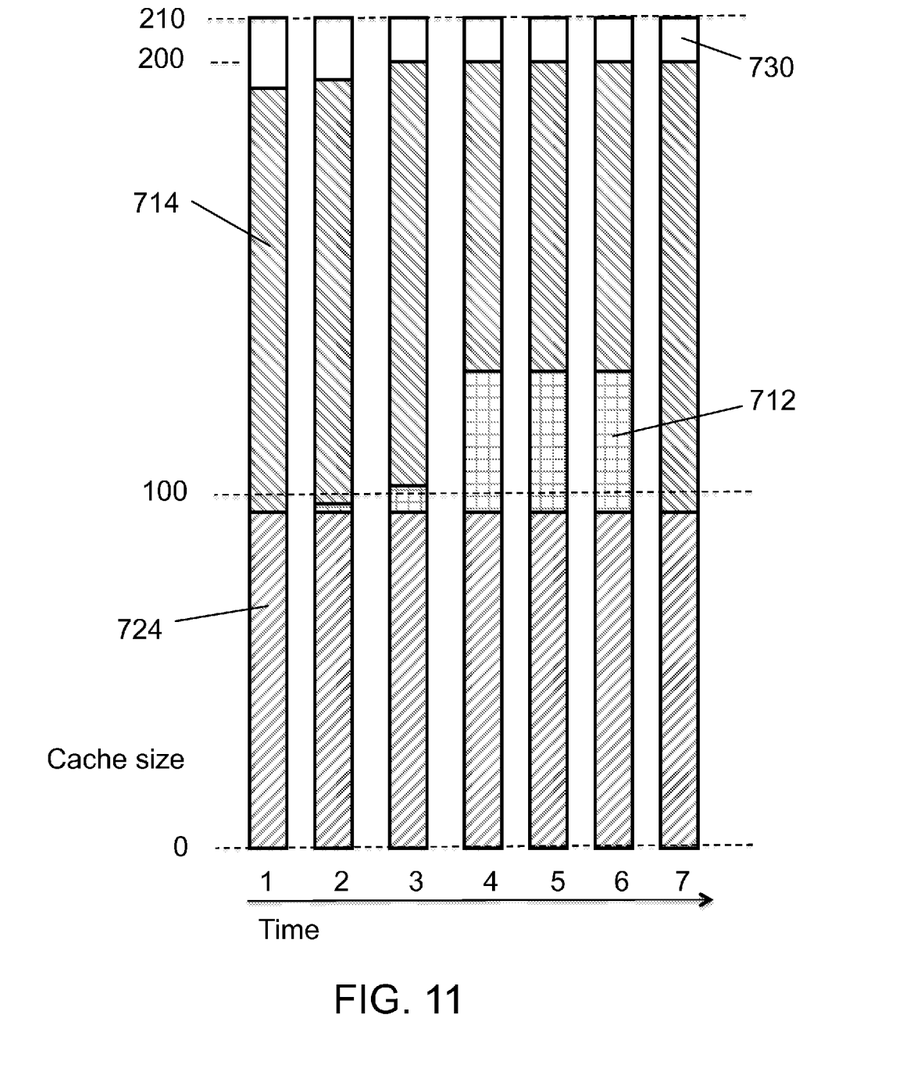
FIG. 11 illustrates a second sequence of how the cache is used.

FIGS. 10 and 11 each present a sequence of how the cache 700 is used under different circumstances. In both figures, the caches size is 210 units, the open host controller manages up to 100 units of space and the mainframe host controller manages ups to 200 units space for the combines open and mainframe data. At time 1 in FIG. 10, all data from both hosts is premigrated (714, 724) and data levels are below throttling thresholds. At time 2, the open host begins running and requests free space. The mainframe controller removes premigrated data to free space and both hosts are slowed down if necessary to allow space to become free. At time 3 enough open host data has been written to reach the open threshold; the open cache manager begins removing premigrated data to maintain the threshold, throttling the open host if necessary.

At time 4, enough new open host data has run to reach the premigration threshold and the open host is throttled if necessary to maintain this level. At times 5 and 6, a steady state has been reached and is maintained. Finally, at time 7, writing from the open host ends, the free space request is cancelled and the open host data becomes premigrated and written out to tape.

FIG. 11 illustrates a similar sequence but one in which mainframe data is being written. At time 1 in FIG. 11, all data from both hosts again is premigrated (714, 724) and data levels are below throttling thresholds. At time 2, the mainframe host begins running and requests free space. The mainframe controller removes premigrated data to free space and both hosts are slowed down if necessary to allow space to become free. At time 3, enough mainframe host data has been written to reach the open threshold; the mainframe cache manager begins removing premigrated data to maintain the threshold, throttling the mainframe and/or open hosts if necessary.

At time 4, enough new mainframe host data has run to reach the premigration threshold and the mainframe host is throttled if necessary to maintain this level. At times 5 and 6, a steady state has been reached and is maintained. Finally, at time 7, writing from the mainframe host ends, the free space request is cancelled and the open mainframe data becomes premigrated and written out to tape.

Figure 12:
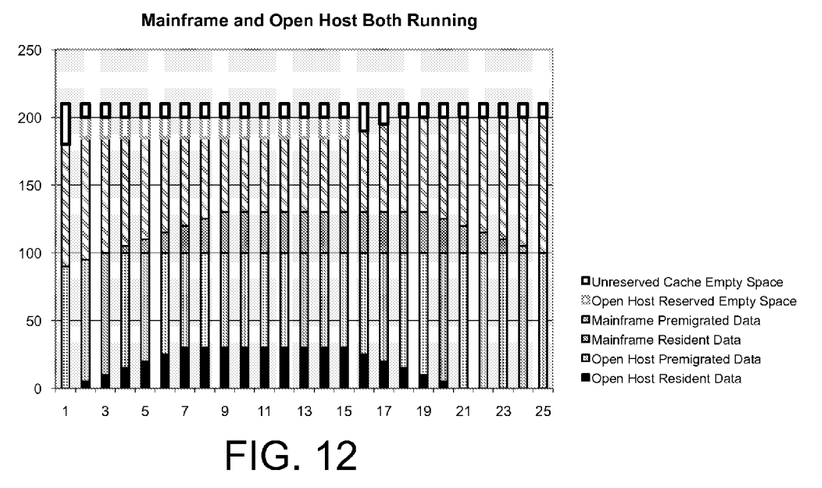
FIG. 12 illustrates a first sequence in which the mainframe and open hosts are operating simultaneously.
Figure 13:
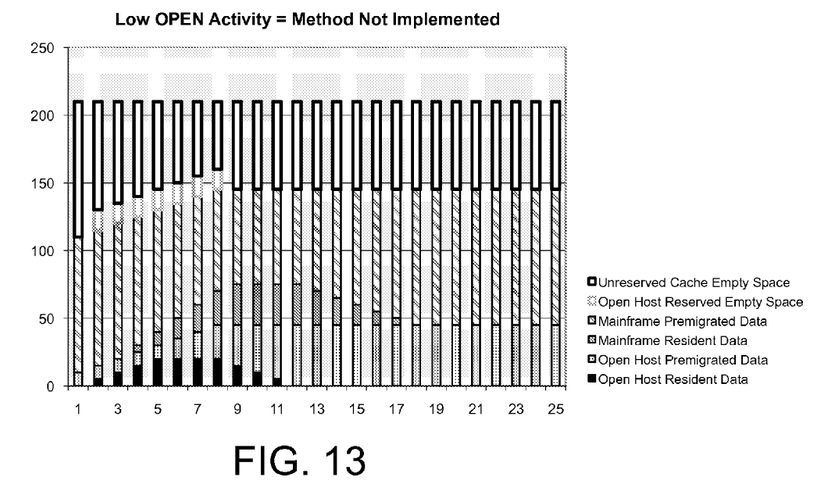
FIG. 13 illustrates a second sequence in which the mainframe and open hosts are operating simultaneously but with the open host at a low level of activity and the claimed invention not enabled.
Figure 14:
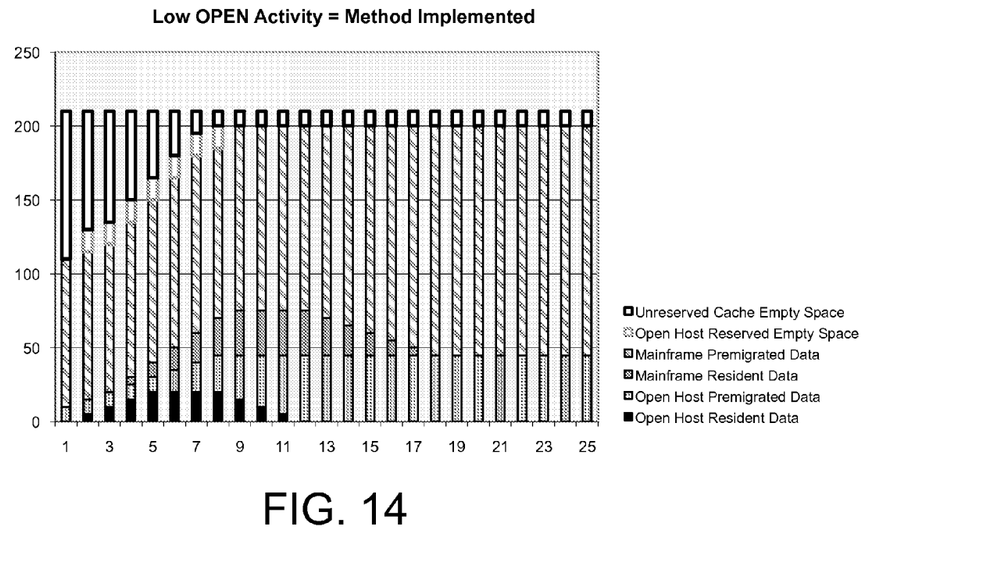
FIG. 14 illustrates a third sequence in which the mainframe and open hosts are operating simultaneously but with the open host at a low level of activity and the claimed invention enabled.

FIGS. 12-14 present sequences in which both hosts operate simultaneously. In FIG. 12, the beginning and ending of the mainframe and open data operations have been staggered for illustrative purposes to more clearly highlight the interactions. In FIG. 13, the present invention is not enabled and activity of the open host is low such that it does not use its full cache capacity. The result is significant wasted space because the size of the unreserved cache space is not adjusted. In FIG. 14, again activity of the open host is low but the present invention is enabled. As a result, the mainframe controller is able to use capacity for mainframe data that is not needed for open data.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing shared first level storage among multiple virtual tape servers or a method for deploying computing infrastructure comprising integrating computer readable code into a computing system for managing shared first level storage among multiple virtual tape servers.

What is claimed is:

1. A virtual tape server (VTS), comprising:
a first host adapter through which a first host is coupled;
a second host adapter through which a second host is coupled;
a VTS controller;
a virtual tape emulation (VTE) through which a first level storage unit is coupled, the first level storage unit having a first partition allocated to the first host and a second partition allocated to the second host;
a first hierarchical storage controller ("HSC") coupled to a first physical tape storage unit ("first tape unit"), the first HSC operable to manage removal of data from the first partition to the first tape unit;
a second HSC coupled to a second physical tape storage unit ("second tape unit"), the second HSC operable to manage removal of data from the second partition to the second tape unit;
a first free-space controller coupled to the VTS controller and operable to determine a total amount of free space in the first level storage unit;
a second free-space controller coupled to the VTS controller and operable to determine an amount of free space in the second partition;

a first throttling controller responsive to the first free-space controller and operable to manage the flow of data to the first partition; and a second throttling controller responsive to the second free-space controller and operable to manage the flow of data to the second partition;

the VTS controller operable to:
periodically receive an indication of the total amount of free space in the first level storage unit;
periodically receive an indication of the amount of free space in the second partition from the second free-space controller;
calculate a difference between the total amount of free space in the first level storage unit and the amount of free space in the second partition; and
periodically transmit to the first free-space controller the calculated difference as the amount of free space available to the first partition, whereby free space in the second partition is not encroached upon by data associated with the first host.

2. The VTS of claim 1, wherein the first level storage unit comprises a disk cache.

3. A method for managing shared first level storage among multiple virtual tape servers, comprising:
partitioning a first level storage unit into first and second partitions;
allocating the first partition to a first host and allocating the second partition to a second host;
receiving first user data for the first host;
determining the amount of free space in the first level storage unit;
determining the amount of free space in the second partition;
calculating the difference between the amount of free space in the first level storage unit and the amount of free space in the second partition;
if the calculated difference is greater than a first threshold, storing the received first user data in the first partition;
if the calculated difference is not greater than the first threshold:
  a) throttling the received first user data;
  b) copying second user data, previously stored in the first partition, from the first partition to a second level storage unit;
  c) re-determining the amount of free space in the first level storage unit;
  d) re-determining the amount of free space in the second partition;
  e) re-calculating the difference between the amount of free space in the first level storage unit and the amount of free space in the second partition;
  f) if the calculated difference is not greater than the first threshold, repeating steps a) through e) until the calculated difference is greater than the first threshold; and
  g) when the calculated difference is greater than the first threshold, storing the received first user data in the first partition.

4. The method of claim 3, wherein partitioning first level storage unit into first and second partitions comprises partitioning a disk cache into first and second partitions.

5. A computer program product of a computer readable medium usable with a programmable computer, the computer program product having computer-readable code embodied therein for managing shared first level storage among multiple virtual tape servers, the computer-readable code comprising instructions for:

partitioning a first level storage unit into first and second partitions;
allocating the first partition to a first host and allocating the second partition to a second host;
receiving first user data for the first host;
determining the amount of free space in the first level storage unit;
determining the amount of free space in the second partition;
calculating the difference between the amount of free space in the first level storage unit and the amount of free space in the second partition;
if the calculated difference is greater than a first threshold, storing the received first user data in the first partition;
if the calculated difference is not greater than the first threshold:
  a) throttling the received first user data;
  b) copying second user data, previously stored in the first partition, from the first partition to a second level storage unit;
  c) re-determining the amount of free space in the first level storage unit;
  d) re-determining the amount of free space in the second partition;
  e) re-calculating the difference between the amount of free space in the first level storage unit and the amount of free space in the second partition;
  f) if the calculated difference is not greater than the first threshold, repeating steps a) through e) until the calculated difference is greater than the first threshold; and
  g) when the calculated difference is greater than the first threshold, storing the received first user data in the first partition.

6. The method of claim 5, wherein the instructions for partitioning first level storage unit into first and second partitions comprise instructions for partitioning a disk cache into first and second partitions.

7. A method for deploying computing infrastructure comprising integrating computer readable code into a computing system for managing shared first level storage among multiple virtual tape servers, comprising:
partitioning a first level storage unit into first and second partitions;
allocating the first partition to a first host and allocating the second partition to a second host;
receiving first user data for the first host;
determining the amount of free space in the first level storage unit;
determining the amount of free space in the second partition;
calculating the difference between the amount of free space in the first level storage unit and the amount of free space in the second partition;
if the calculated difference is greater than a first threshold, storing the received first user data in the first partition;
if the calculated difference is not greater than the first threshold:
  a) throttling the received first user data;
  b) copying second user data, previously stored in the first partition, from the first partition to a second level storage unit;
  c) re-determining the amount of free space in the first level storage unit;

d) re-determining the amount of free space in the second partition;
e) re-calculating the difference between the amount of free space in the first level storage unit and the amount of free space in the second partition;
f) if the calculated difference is not greater than the first threshold, repeating steps a) through e) until the calculated difference is greater than the first threshold; and
g) when the calculated difference is greater than the first threshold, storing the received first user data in the first partition.

8. The method of claim 7, wherein partitioning first level storage unit into first and second partitions comprises partitioning a disk cache into first and second partitions.

* * * * *